(12) United States Patent
Sato

(10) Patent No.: US 7,490,892 B2
(45) Date of Patent: Feb. 17, 2009

(54) VEHICLE DECK STRUCTURE

(75) Inventor: Kenji Sato, Ichinomiya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 12/149,711

(22) Filed: May 7, 2008

(65) Prior Publication Data
US 2008/0277969 A1 Nov. 13, 2008

(30) Foreign Application Priority Data
May 11, 2007 (JP) ............................. 2007-127165

(51) Int. Cl.
*B62D 21/03* (2006.01)
(52) U.S. Cl. .............. 296/184.1; 296/193.07; 296/204
(58) Field of Classification Search ............ 296/193.07, 296/203.04, 204, 193.08, 184.1
See application file for complete search history.

(56) References Cited

U.S. PATENT DOCUMENTS 5,730,486 A * 3/1998 Jurica ..................... 296/184.1
7,322,640 B2 * 1/2008 Ni et al. .................... 296/204

FOREIGN PATENT DOCUMENTS

JP 6-25085 4/1994

* cited by examiner

*Primary Examiner*—Joseph D Pape
(74) *Attorney, Agent, or Firm*—Finnegan, Henderson, Farabow, Garrett & Dunner, LLP

(57) ABSTRACT

A vehicle deck structure that can suppress deformation of a deck floor is provided. The vehicle deck structure includes a deck floor extending in a vehicle body front-rear direction and a vehicle width direction, a cross member having a longitudinal direction that corresponds to the vehicle width direction and provided at a lower side of the deck floor, a mount lower surface reinforcement that closes off a downward open end of the cross member to form a closed cross-section portion Sc, a collar that is provided within the closed cross-section portion Sc and supports a fastening load for fastening the deck floor to a chassis frame F, and a rear cross reinforcement that is provided at a front side or a rear side in the vehicle body front-rear direction with respect to an installation portion of the collar at the deck floor. The rear cross reinforcement includes an upper wall joined with the deck floor, a lower wall fixed at a front flange of the mount lower surface reinforcement, and an upright wall connecting the upper wall and the lower wall.

4 Claims, 9 Drawing Sheets

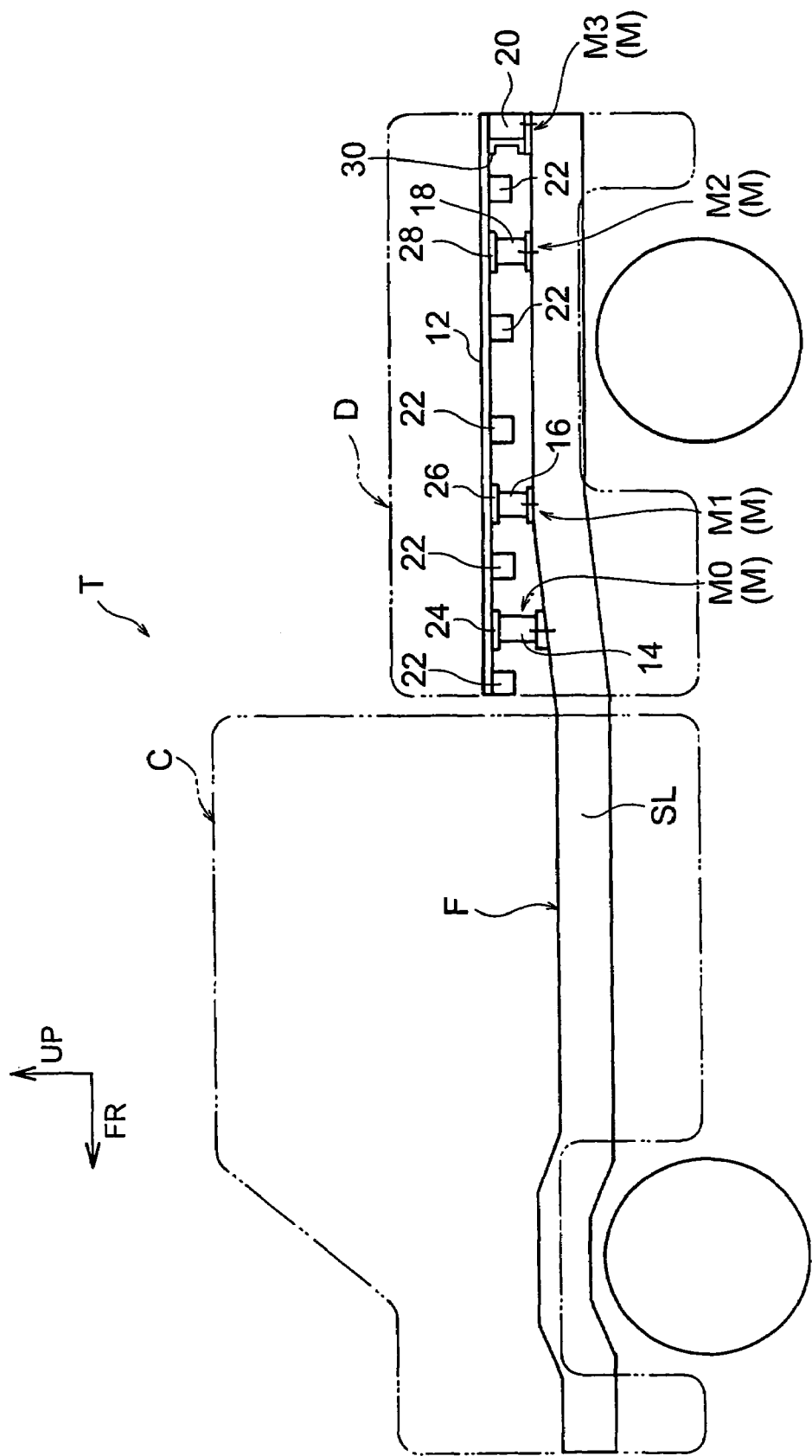

(12) United States Patent
US 7,490,892 B2

VEHICLE DECK STRUCTURE

CROSS-REFERENCE TO RELATED APPLICATION

This application claims priority under 35 USC 199 from Japanese Patent Application No. 2007-127165, the disclosure of which is incorporated by reference herein.

BACKGROUND OF THE INVENTION

1. Technical Field

The present invention relates to a vehicle deck structure that is applied, for example, to a loading bed of a small-size truck or the like.

2. Related Art

In a small-size truck, as described, for example, in Japanese Utility Model Application Laid-Open (JP-U) No. 6-25085, a chassis frame is configured by a pair of right and left side members extending in a vehicle body front-rear direction and a cross member connecting the pair of right and left side members, and a rear deck is provided on this chassis frame. The rear deck is mounted to the chassis frame via cross members fixed at a lower side of the deck floor at a plurality of places spaced apart in the vehicle body front-rear direction.

SUMMARY

In the conventional art such as described above, although a ridge is provided at the deck floor, there is concern that rigidity of the deck floor needs to be enhanced in a case where, for example, the load of a loaded material or the input from a road surface is great.

In consideration of the circumstances described above, an object of the present invention is to provide a vehicle deck structure that can suppress deformation of a deck floor.

A vehicle deck structure according to a first aspect of the present invention comprises a deck floor extending in a vehicle body front-rear direction and a vehicle width direction; a cross member that is open facing downward in a vehicle body up-down direction and whose longitudinal direction corresponds to the vehicle width direction, the cross member being fixed at a lower surface side in the vehicle body up-down direction with respect to the deck floor; a first reinforcing member forming a closed cross-section structure with the cross member at least one portion in the longitudinal direction of the cross member and comprising a flange portion that overhangs in a vehicle body front-rear direction with respect to the closed cross-section portion and faces the deck floor; a support member that is disposed within the closed cross-section formed by the cross member and the first reinforcing member and supports a fastening load for fastening the cross member to a vehicle body frame; and a second reinforcing member provided at a front side or a rear side in the vehicle body front-rear direction with respect to an installation portion of the support member in the cross member and comprising an upper wall that is fixed at the deck floor, a lower wall that is fixed at the flange portion of the first reinforcing member, and an upright wall that connects the upper wall and the lower wall.

BRIEF DESCRIPTION OF THE DRAWINGS

Embodiments of the present invention will be described in detail based on the following figures, wherein:

FIGS. 1A and 1B are cross-sectional views showing the main part of a vehicle deck structure according to an embodiment of the present invention, in which FIG. 1A is a cross-sectional view along line 1A-1A in FIG. 3, and FIG. 1B is a cross-sectional view along line 1B-1B in FIG. 3;

FIGS. 7A and 7B are views showing an attached state of the vehicle deck structure according to the embodiment of the present invention, in which FIG. 7A is a cross-sectional view corresponding to FIG. 1A in a case where a load from a road surface acts on a deck mount, and FIG. 7B is a cross-sectional view corresponding to FIG. 1B in a case where a load from a road surface acts on the deck mount and a loading load acts on the deck floor;

FIG. 8 is a side view showing in frame format a schematic configuration of a motor vehicle to which the vehicle deck structure according to the embodiment of the present invention has been applied; and FIGS. 9A and 9B are views showing in frame format a deformation state of a vehicle deck structure according to a comparative example to the embodiment of the present invention, in which FIG. 9A is a cross-sectional view showing deformation of a deck mount portion, and FIG. 9B is a cross-sectional view showing deformation of a portion that is further toward a vehicle width direction inner side than the deck mount.

DETAILED DESCRIPTION OF THE INVENTION

Figure 1A:
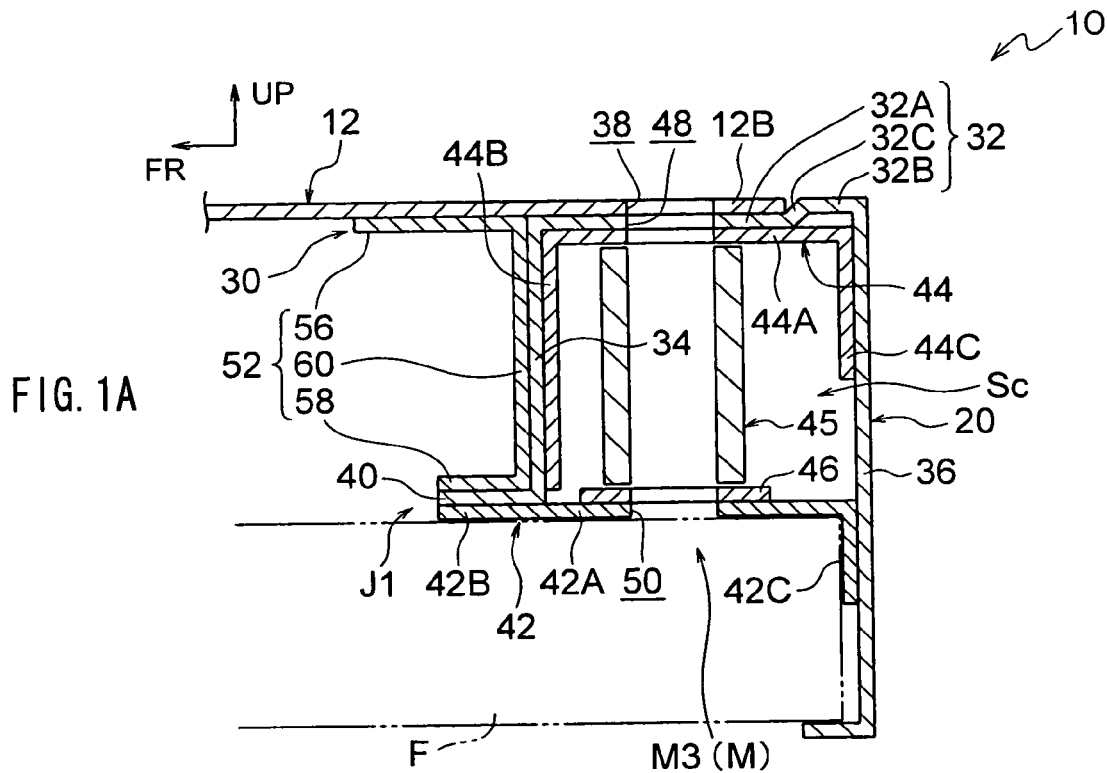

Herebelow, an example of an exemplary embodiment of the present invention will be described in detail with reference to the drawings.

A vehicle deck structure 10 according to an exemplary embodiment of the present invention will be explained based on FIGS. 1 to 8. It should be noted that, arrow FR, arrow UP and arrow W, which are appropriately shown in the drawings, indicate a front direction in a vehicle body front-rear (traveling) direction of a motor vehicle T serving as a vehicle to which the vehicle deck structure 10 is applied, an up direction in a vehicle body up-down direction, and a vehicle width direction, respectively.

In FIG. 8, a schematic configuration of the motor vehicle T to which the vehicle deck structure 10 is applied is shown in a side view. As shown in this drawing, the motor vehicle T is a small-size truck having a structure with a frame and is provided with a chassis frame F extending in a vehicle body front-rear direction. The chassis frame F comprises a pair of right and left side rails SL, whose longitudinal directions each correspond to the vehicle body front-rear direction, and a plurality of unillustrated cross members bridging between the pair of right and left side rails SL, and forms a substantial ladder shape in plan view.

At a front portion of the chassis frame F, a cab C serving as a driver's platform is supported via an unillustrated cab mount, and at a rear portion of the chassis frame F, a deck D serving as a loading bed is supported via a plurality of deck mounts M. More specifically, the deck D is supported via a plurality of (four at each of the right and left in the present exemplary embodiment) deck mounts M0 to M3 spaced apart in the vehicle body front-rear direction, with respect to the pair of right and left side rails SL of the chassis frame F. Further, the vehicle deck structure 10 according to the exemplary embodiment of the present invention is applied to the deck D. This is explained specifically below.

Figure 2:
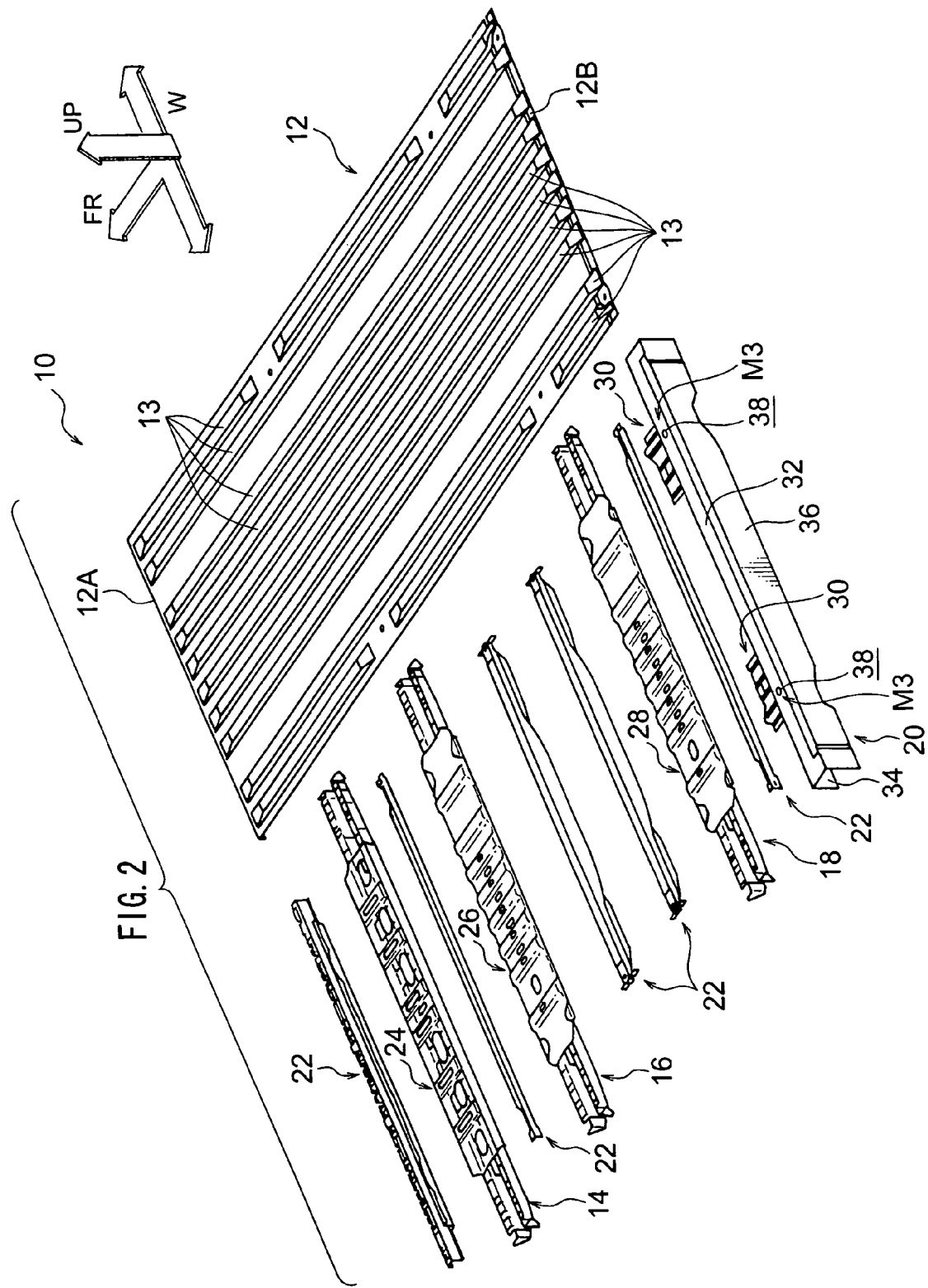
FIG. 2 is an exploded perspective view of the vehicle deck structure according to the embodiment of the present invention.

In FIG. 2, an exploded perspective view of the deck D to which the vehicle deck structure 10 is applied is shown. As shown in the drawing, the deck D is provided with a deck floor 12 extending in the vehicle body front-rear direction and the vehicle width direction. In the deck floor 12, a plurality of ridges 13, whose longitudinal directions correspond to the vehicle body front-rear direction, are formed so as to be arranged in parallel in the vehicle width direction by press working or the like of a panel material (plate material).

Further, the deck D is provided with a plurality of cross members 14, 16, 18 and 20 that are fixed at a lower surface side, in a vehicle body up-down direction, of the deck floor 12. The respective cross members 14, 16, 18 and 20 each have a longitudinal direction corresponding to the vehicle width direction and are disposed so as to be spaced apart from each other in the vehicle body front-rear direction. The cross member 14 positioned furthest to the front side is disposed slightly behind a front end 12A of the deck floor 12, and the cross member 20 positioned furthest to the rear side is positioned along a rear end 12B of the deck floor 12.

Further, as shown in FIG. 2, a plurality of cross members 22 that are not supported by the chassis frame F are fixed at the lower surface of the deck floor 12. The plurality of cross members 22 each have a longitudinal direction corresponding to the vehicle width direction and are disposed so as to be spaced apart in the vehicle body front-rear direction from each of the cross members 14, 16, 18 and 20.

Furthermore, lengths of the respective cross members 14, 16, 18 and 20 along the vehicle width direction are made to be greater than a width of the deck floor 12 along the vehicle width direction. Moreover, the lengths of the respective cross members 14, 16, 18 and 20 along the vehicle width direction are made to be greater than lengths of the plurality of cross members 22 along the vehicle width direction. As shown in FIG. 8, the deck mounts M0, M1, M2 and M3 support the deck D at the cross members 14, 16, 18 and 20 in the deck D. It should be noted that the pairs of right and left deck mounts M0, M1, M2 and M3 are each disposed within the range of the width of the deck floor 12 in the vehicle width direction.

In the vehicle deck structure 10, reinforcing members 24, 26 and 28 are respectively interposed between the cross members 14, 16 and 18 and the deck floor 12.

Figure 3:
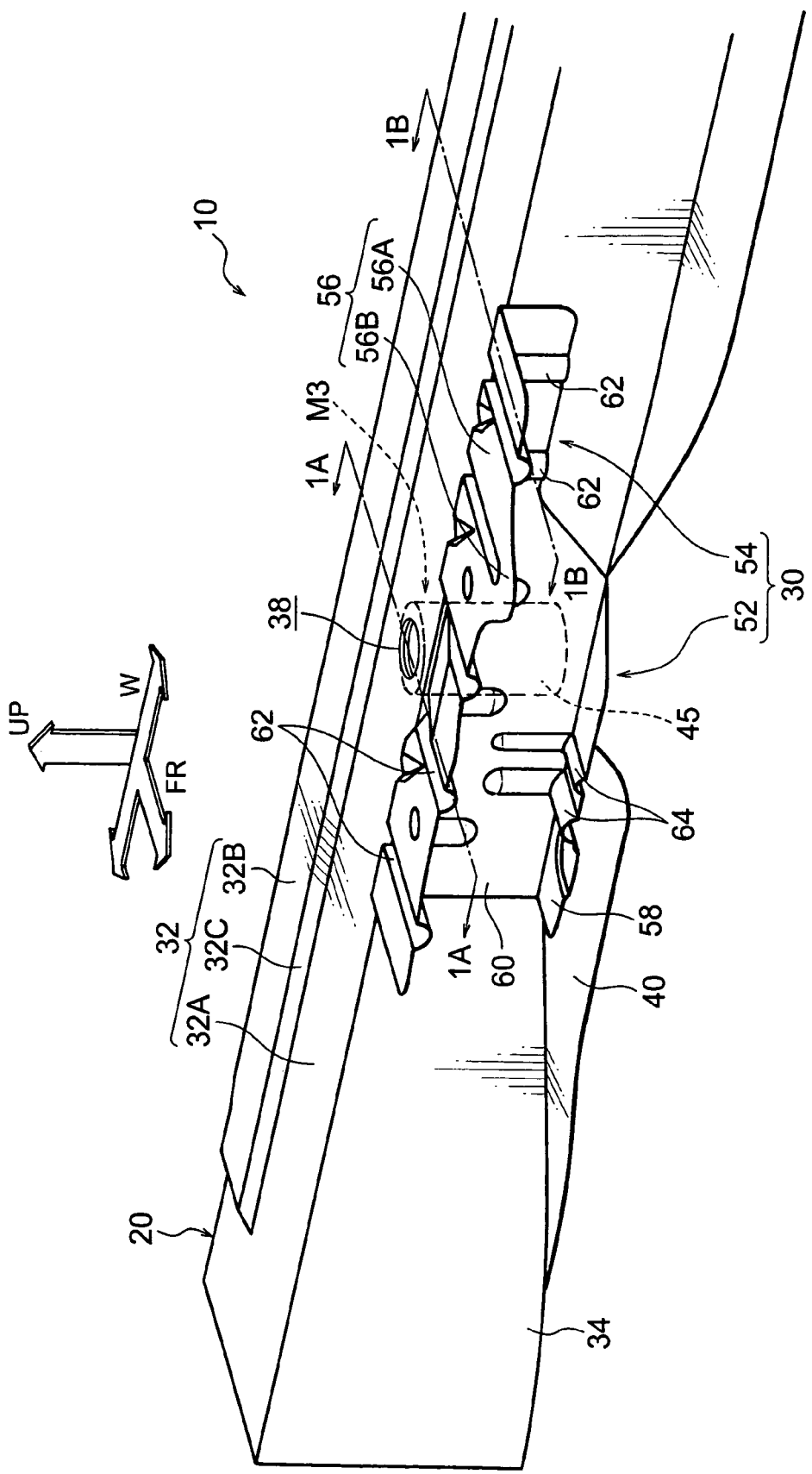
FIG. 3 is a perspective view in which the main part of the vehicle deck structure according to the embodiment of the present invention is expanded and shown.

Further, as shown in FIG. 2 and FIG. 3, the vehicle deck structure 10 comprises a rear cross reinforcement 30 serving as a second reinforcing member provided at the cross member 20 supported by the deck mount M3. First, the cross member 20 corresponding to the cross member of the present invention reinforced by the rear cross reinforcement 30 will be explained, and then, the rear cross reinforcement 30 will be explained in detail.

As shown in FIG. 2 and FIG. 3, the cross member 20 comprises an upper wall 32 to which the deck floor 12 is joined, and a front wall 34 and an upright wall 36 which respectively formed downward from both edges in the vehicle body front-rear direction of the upper wall 32, and as a whole forms a substantial U shape opening downward in the vehicle body up-down direction when seen in side view. A rear end 12B of the deck floor 12 is joined to a front portion 32A of the upper wall 32, and a step portion 32C is formed between the front portion 32A and a rear portion 32B so that the rear portion 32B substantially forms a plane with the deck floor 12. In the present exemplary embodiment, the upright wall 36 is configured to be longer in the vehicle body up-down direction than the front wall 34 (longer by a thickness of the chassis frame F). Further, the cross member 20 comprises a lower anterior flange 40 provided extending frontward in the vehicle body front-rear direction from a lower edge of the front wall 34.

As shown in FIG. 2, a pair of right and left bolt holes 38 respectively constituting the deck mounts M3 are formed at the cross member 20. Further, in a cross-section (cross-section 1A-1A in FIG. 3) along a vehicle body front-rear direction and passing through the bolt hole 38, a mount lower surface reinforcement 42 serving as a first reinforcing member which forms a closed cross-section portion Sc with the cross member 20 is provided at an installation region of the deck mount M3 in the vehicle width direction of the cross member 20, as shown in FIG. 1A.

More specifically, the mount lower surface reinforcement 42 comprises as main portions thereof a main body plate 42A having a substantially rectangular shape when seen in plan view, a front flange 42B serving as a flange portion provided extending to a front side in the vehicle body front-rear direction in a plane shape from the main body plate 42A, and a rear flange 42C formed downward in the vehicle body up-down direction from a rear end in the vehicle body front-rear direction of the main body plate 42A. Further, the mount lower surface reinforcement 42 forms the closed cross-section portion Sc with the cross member 20 as described above, due to the front flange 42B being joined with the lower surface of the lower anterior flange 40, and the rear flange 42C being joined with the upright wall 36.

Further, a mount reinforcement 44 which reinforces the cross member 20 from an inner side is provided at the installation region of the deck mount M3 in the vehicle width direction of the cross member 20. The mount reinforcement 44 comprises as main portions thereof a main body plate 44A having a substantially rectangular shape when seen in plan view, a front flange 44B which is formed downward in the vehicle body up-down direction from a front end in the vehicle body front-rear direction of the main body plate 44A, and a rear flange 44C which is formed downward in the vehicle body up-down direction from a rear end in the vehicle body front-rear direction of the main body plate 44A. Further, in the mount reinforcement 44, the front flange 44B is joined with the front wall 34, and the rear flange 44C is joined with the upright wall 36.

Moreover, a collar 45 serving as a support member is disposed in the closed cross-section portion Sc constituted by the cross member 20 and the mount lower surface reinforcement 42. The collar 45 is formed with a substantially cylindrical shape, and the lower end thereof is fixed at the main body plate 42A of the mount lower surface reinforcement 42 via a mount patch 46. Further, in the deck mount M3, an upper side through hole 48 penetrating the upper wall 32 of the cross member 20 and the main body plate 44A of the mount reinforcement 44, and a lower side through hole 50 penetrating the mount patch 46 and the main body plate 42A of the mount lower surface reinforcement 42, are each provided coaxially with the bolt hole 38 and the collar 45.

As a result, in the deck mount M3, the collar 45 is fastened to the chassis frame F so as to support a fastening load, and the cross member 20 is supported at (connected with) the chassis frame F. More specifically, a configuration is provided in which the cross member 20 is fastened to the chassis frame F, for example, by fastening a collar provided at the interior of the chassis frame F and the collar 45 with a common bolt and nut, or by screwing a bolt penetrating the collar of the chassis frame F together with the collar 45. In the latter case, the bolt hole 38 and the upper side through hole may be made unnecessary, or the bolt hole 38 and the upper side through hole 48 may be made to penetrate the collar 45 to fix the collar 45 at this penetration portion.

Figure 1B:
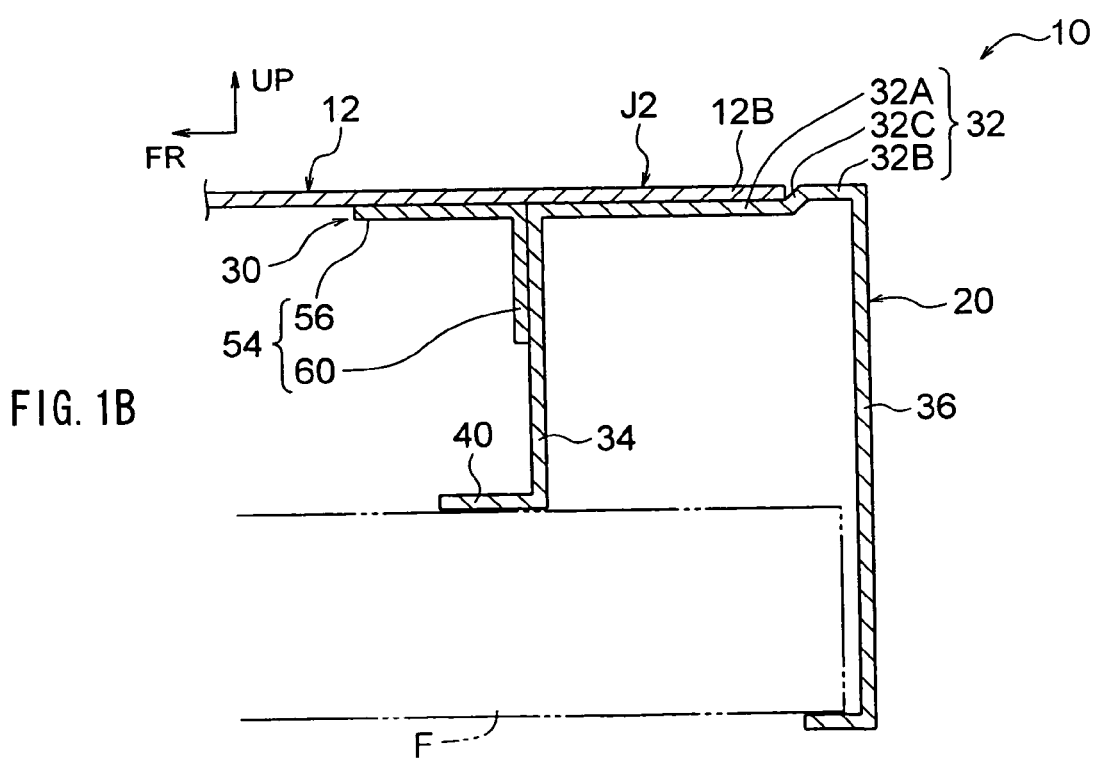

Further, in a cross-section 1B-1B in FIG. 3, as shown in FIG. 1B, at a position offset in the vehicle width direction from the installation region of the deck mount M3 in the cross member 20, the mount lower surface reinforcement 42 and the mount reinforcement 44 are not provided, and the cross member 20 opens downward in the vehicle body up-down direction.

Further, as shown in FIG. 2, in the vehicle deck structure 10, rear cross reinforcements 30 are respectively disposed at front sides in the vehicle body front-rear direction with respect to the installation regions of the deck mounts M3 in the cross member 20. Since the right and left rear cross reinforcements 30 (deck mounts M3) are basically formed with right-left symmetry, one of the rear cross reinforcements 30 will be explained below.

Figure 5:
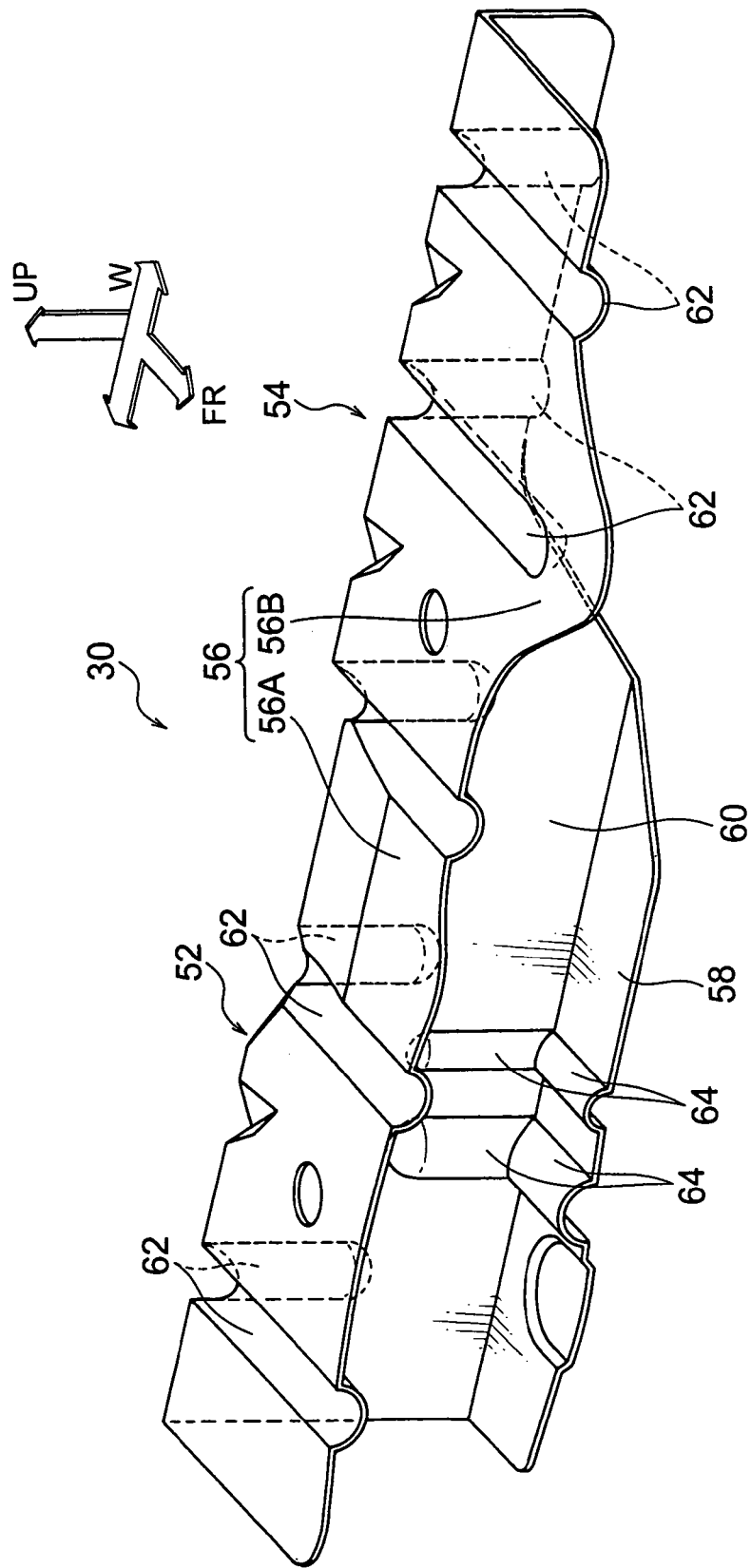
FIG. 5 is a perspective view of the rear cross reinforcement constituting the vehicle deck structure according to the embodiment of the present invention.

As shown in FIG. 3 and FIG. 5, the rear cross reinforcement 30 is configured comprising a first reinforcing portion 52 that forms a substantial U shape opening frontward in the vehicle body front-rear direction when seen in side view and a second reinforcing portion 54 that forms a substantial L shape when seen in vehicle side view. More specifically, the rear cross reinforcement 30 comprises as main portions thereof an upper wall 56 that is joined with the lower surface of the deck floor 12, a lower wall 58 that is joined with the front flange 42B of the mount lower surface reinforcement 42, and an upright wall 60 which connects between vehicle body front-rear direction rear ends of the upper wall 56 and the lower wall 58.

As shown in FIG. 5, a position of a vehicle width direction outer end of the upper wall 56 substantially corresponds to a position of a vehicle width direction outer end of the lower wall 58, and at a vehicle width direction inner side, the upper wall 56 is configured to be longer in the vehicle width direction than the lower wall 58. In the rear cross reinforcement 30, a range where the lower wall 58 is installed in the vehicle width direction is mainly defined as the first reinforcing portion 52. Further, the upright wall 60 is configured such that a height of the upright wall 60 in the vehicle body up-down direction in the second reinforcing portion 54 is shorter than a height of the upright wall 60 in the vehicle body up-down direction in the first reinforcing portion 52 (an up-down direction distance between the upper wall 56 and the lower wall 58).

That is to say, in the rear cross reinforcement 30, the vehicle width direction outer side portion in which the upper wall 56, the lower wall 58 and the upright wall 60 form a substantial U shape opening frontward in the front-rear direction is defined as the first reinforcing portion 52, and the vehicle width direction inner side portion which is continuous at the vehicle width direction inner side of the first reinforcing portion 52 and in which the upper wall 56 and the upright wall 60 form a substantial L shape is defined as the second reinforcing portion 54 serving as the extending portion of the present invention.

Further, as shown in FIG. 3 and FIG. 5, from a general portion 56A that forms a substantially rectangular shape when seen in plan view in the upper wall 56 (i.e., a portion having substantially the same width in the front-rear direction), one portion in the vehicle width direction in the portion constituting the second reinforcing portion 54 overhangs frontward in the vehicle body front-rear direction to form an overhang portion 56B. In the present exemplary embodiment, the overhang portion 56B is formed with a substantial chevron shape when seen in plan view. Moreover, as shown in FIG. 5, in the rear cross reinforcement 30, reinforcing ridges 62 straddling the upper wall 56 and the upright wall 60 and reinforcing ridges 64 straddling the lower wall 58 and the upright wall 60 are provided at the first reinforcing portion 52, and reinforcing ridges 62 are provided at the second reinforcing portion 54.

Figure 4:
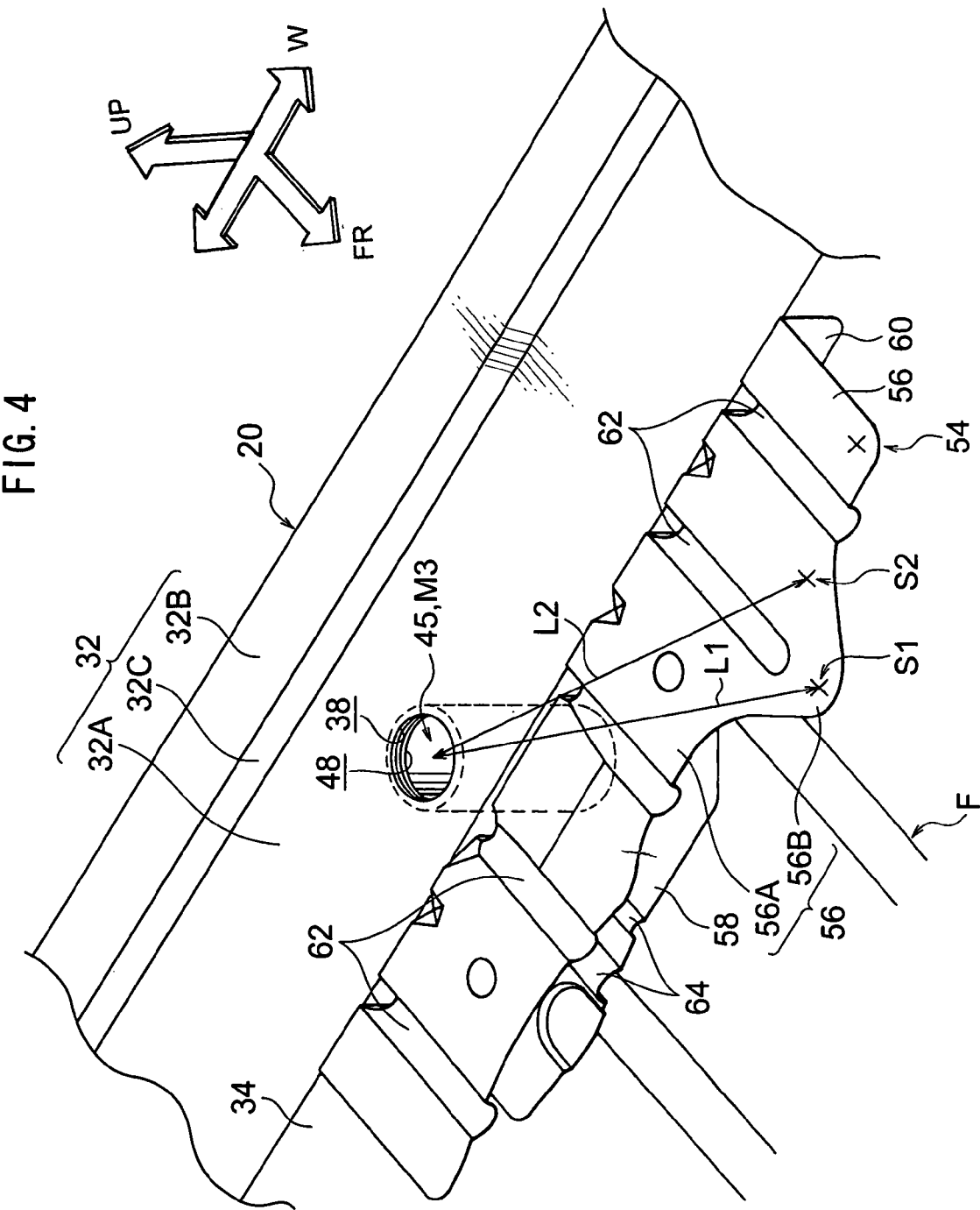
FIG. 4 is a perspective view showing joining points of a rear cross reinforcement constituting the vehicle deck structure according to the embodiment of the present invention, to a deck floor.

In a state, as shown in FIG. 3 and FIG. 4, in which the above-described rear cross reinforcement 30 is disposed at the front side in the vehicle body front-rear direction with respect to the cross member 20, the first reinforcing portion 52 is fixed at the front side of the installation region of the deck mount M3 as shown in FIG. 1A, and the second reinforcing portion 54 is fixed at a region that is offset in the vehicle width direction from the installation region of the deck mount M3 as shown in FIG. 1B.

As shown in FIG. 1A, in the first reinforcing portion 52, the upper wall 56 is joined by spot welding or the like with the deck floor 12, and the lower wall 58 is joined by spot welding or the like with the front flange 42B and the lower anterior flange 40 in a state in which the lower anterior flange 40 of the cross member 20 is sandwiched between the lower wall 58 and the front flange 42B of the mount lower surface reinforcement 42. Further, in the first reinforcing portion 52, the upright wall 60 is joined by spot welding or the like with the front flange 44B of the mount reinforcement 44 and the front wall 34 of the cross member 20.

Meanwhile, as shown in FIG. 1B, in the second reinforcing portion 54, the upper wall 56 is joined by spot welding or the like with the deck floor 12, and the upright wall 60 is joined by spot welding or the like with the front wall 34 of the cross member 20. In FIG. 4, spot welding points of the upper wall 56 and the deck floor 12 in the second reinforcing portion 54 are shown by "x" marks. Among these spot welding points, a distance of a spot welding point S1 that is disposed in the overhang portion 56B, from an axial center of the deck mount M3 (collar 45), and a distance of a spot welding point S2 that is disposed in the general portion 56A at a vehicle width direction outer side of the spot welding point S1, from the axial center of the deck mount M3 (collar 45), substantially correspond to each other. That is to say, a distance L1 from the axial center of the deck mount M3 to the spot welding point S1 and a distance L2 from the axial center of the deck mount M3 to the spot welding point S2 are set so as to be substantially equal distances.

Figure 6:
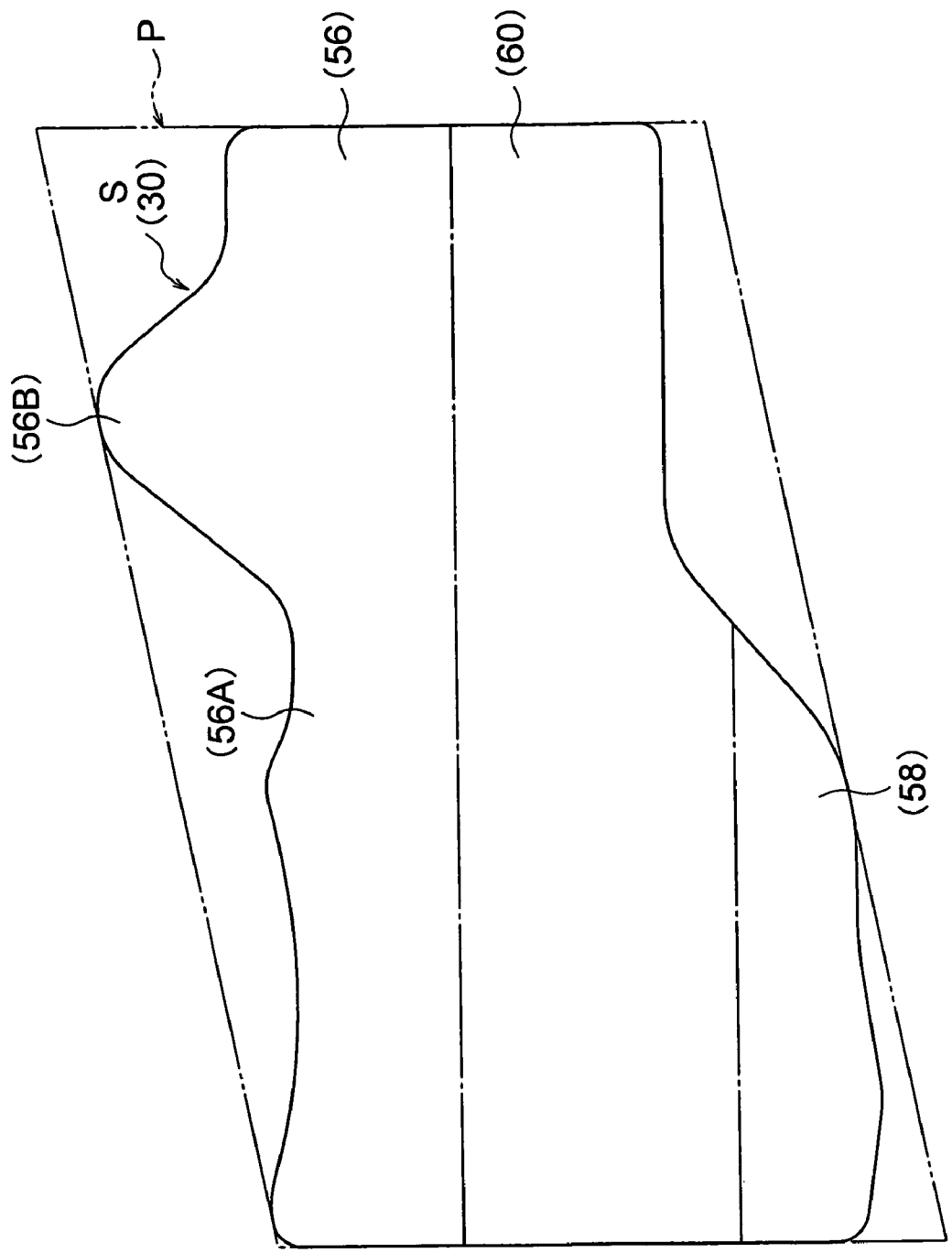
FIG. 6 is a development view of the rear cross reinforcement constituting the vehicle deck structure according to the embodiment of the present invention.

Further, the above-described rear cross reinforcement 30 is cut out in the expanded shape S shown by solid lines in FIG. 6 from a plate material P blanked in a parallelogram shape as shown by the imaginary lines of the double-dotted dashed lines in FIG. 6, and is bent at the portions shown by the single-dotted dashed lines so as to configure the main portions thereof (upper wall 56, lower wall 58 and upright wall 60). In the present exemplary embodiment, the respective portions of the rear cross reinforcement 30, including the reinforcing ridges 62 and the reinforcing ridges 64 are integrally formed by press working or the like.

Next, operation of the present exemplary embodiment will be explained.

In a motor vehicle T to which the vehicle deck structure 10 having the above configuration is applied, at the deck floor 12 of the deck D, a load of a loaded material acts directly, and a load from the chassis frame F (road surface) accompanying traveling of the motor vehicle T acts as an upward thrusting load at the deck mounts M0 to M3.

Figure 7A:
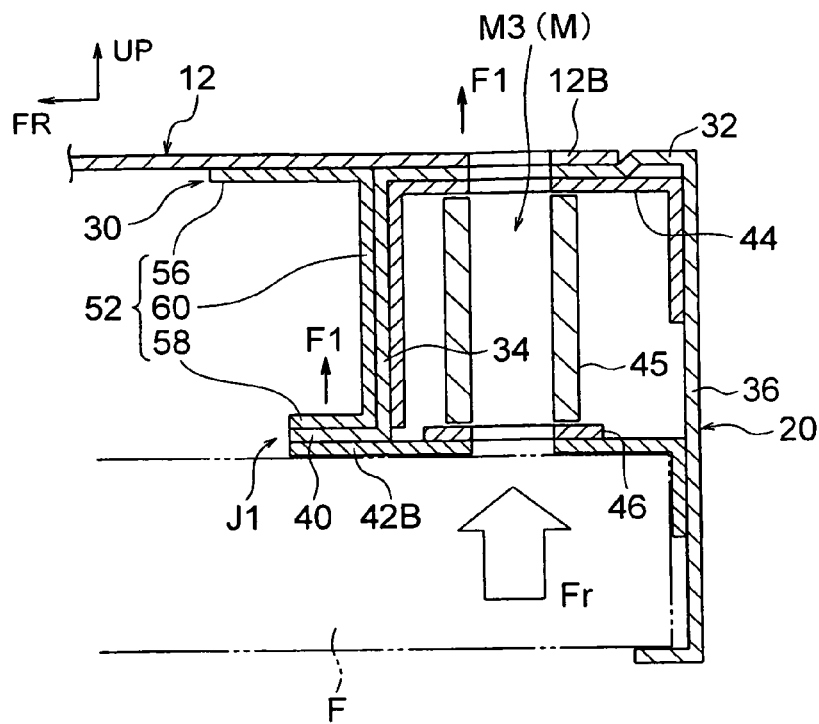

In particular, in the vicinity of the deck mount M3 provided at the cross member 20, in the case where a load Fr that is transmitted from the road surface via the chassis frame F acts as shown in FIG. 7A, at least a portion of the load Fr acts as a force F1 in the direction in which the cross member is held up by the collar 45. As a result, at a joining region J1 of the lower anterior flange 40 of the cross member 20 and the front flange 42B of the mount lower surface reinforcement 42, the force F1 acts, which tends to tear apart this joining in the vehicle body up-down direction (tends to cause the joining region J1 to separate).

Figure 7B:
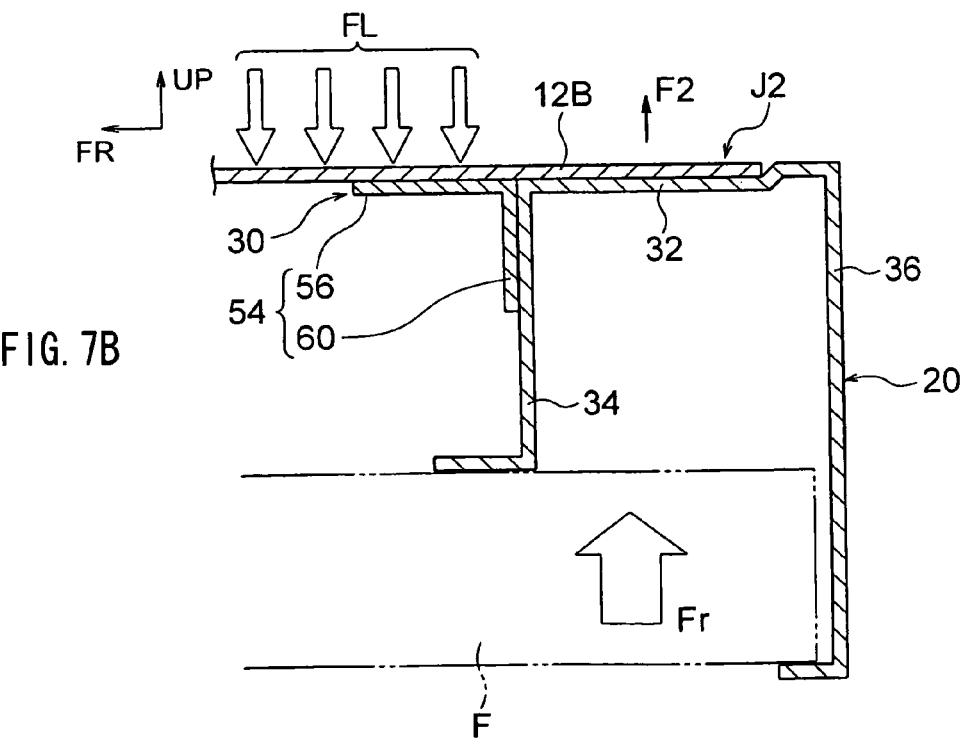

Meanwhile, since the loaded material is mainly put between the right and left deck mounts M in the deck D, in a case where the material is put at a position spaced apart at a vehicle width direction inner side from the deck mount M3, a load FL acts at the front side in the vehicle body front-rear direction with respect to the cross member 20, as shown in FIG. 7B. As a result, a force F2 acts, which tends to tear apart in the vehicle body up-down direction a joining region J2 of the rear end 12B of the deck floor 12 and the upper wall 32 of the cross member 20. Particularly in a case where the load Fr from the road surface acts at the deck mount M3 in the above-described loading state, this results in acting of an even greater force F2.

Figure 9A:
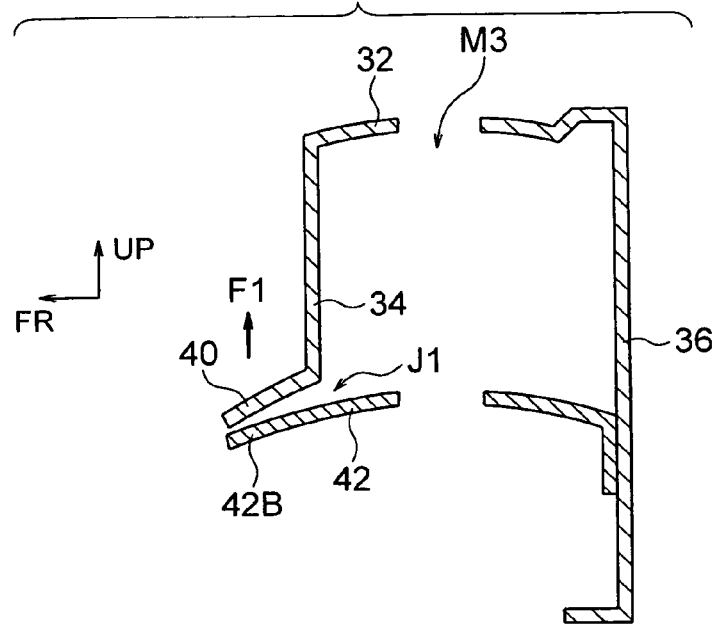

In the vehicle deck structure 10, since the rear cross reinforcement 30 fixed at the front side in the vehicle body front-rear direction with respect to the cross member 20 comprises the first reinforcing portion 52 positioned directly in front of the deck mount M3, the joining region J1 is protected with respect to the above-mentioned force F1. For example, as shown in FIG. 9A, in a configuration in which the rear cross reinforcement 30 (first reinforcing portion 52) is not provided (illustration of the deck floor 12, the mount reinforcement 44, the collar 45 and the mount patch 46 is omitted), upward deformation of the deck floor 12 (relative displacement with respect to the mount lower surface reinforcement 42 of the cross member 20) due to the force F1 becomes large, and stress acting at the joining region J1 of the lower anterior flange 40 and the front flange 42B becomes higher.

In contrast, in the vehicle deck structure 10, since the rear cross reinforcement 30 comprises the substantially U-shaped first reinforcing portion 52 connecting the deck floor 12 and the main body plate 42A of the mount lower surface reinforcement 42, relative displacement in the vehicle body up-down direction of the deck floor 12 (cross member 20) and the mount lower surface reinforcement 42 (upward lifting deformation of the deck floor 12) is suppressed, and fixing of the cross member 20 and the mount lower surface reinforcement 42 is maintained. In other words, in the vehicle deck structure 10, durability strength with respect to load input from the road surface is improved.

Figure 9B:
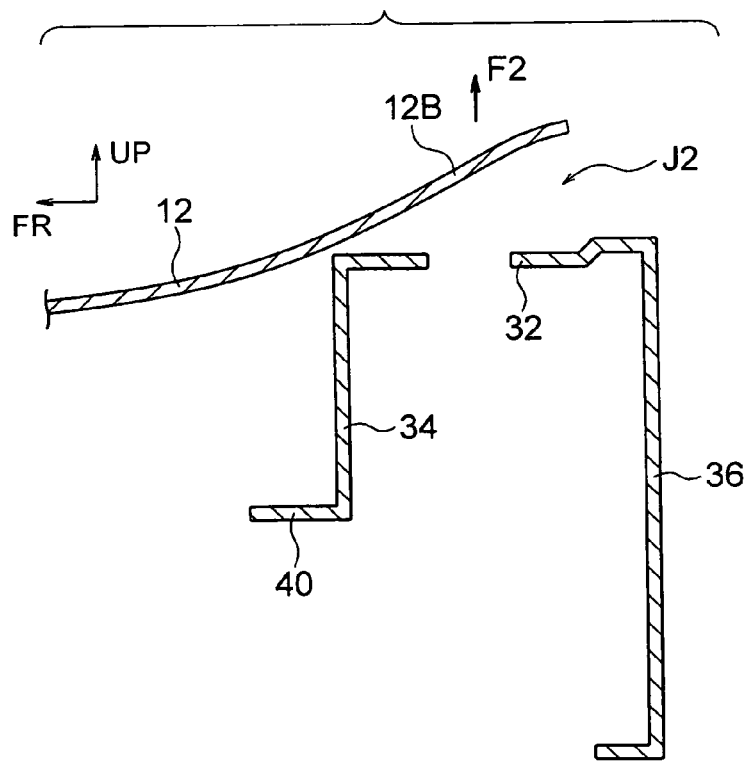

Further, in the vehicle deck structure 10, since the second reinforcing portion 54 is provided at a portion that is offset at a vehicle width direction inner side with respect to the deck mount M3, the joining region J2 of the rear end 12B of the deck floor 12 and the upper wall 32 of the cross member 20 is protected with respect to the above-mentioned force F2. For example, as shown in FIG. 9B, in a configuration in which the rear cross reinforcement 30 (second reinforcing portion 54) is not provided, the deck floor 12 greatly deforms due to lifting by the load Fr at the rear end 12B thereof and subduction by the loading load FL directly in front of the cross member 20 (rear end 12B), and stress acting at the joining region J2 becomes higher.

In contrast, in the vehicle deck structure 10, since the rear cross reinforcement 30 comprises the substantially L-shape second reinforcing portion 54 connecting the deck floor 12 and the front wall 34 of the cross member 20, separation of the deck floor 12 with respect to the cross member 20 is suppressed, or in other words, the force F2 is partially supported at the second reinforcing portion 54, and joining of the rear end 12B of the deck floor 12 and the upper wall 32 of the cross member 20 is maintained. In particular, in the vehicle deck structure 10, since the spot welding points S1 and S2 are disposed so as to be equidistant from the deck mount M3, substantially equal loads (moments based on the load Fr) can be supported at the spot welding points S1 and S2, and it is unlikely for a portion where stress is locally higher in the joining region J2 to be generated. That is to say, stress difference at respective portions of the joining region J2 becomes small. As a result, in the vehicle deck structure 10, durability strength with respect to load input from the loaded material and the road surface is improved.

In this manner, in the vehicle deck structure 10 according to the present exemplary embodiment, deformation of the deck floor 12 can be suppressed, and durability strength of the respective joining regions J1 and J2 can be improved.

Further, in the vehicle deck structure 10, since the first reinforcing portion 52 and the second reinforcing portion 54 are configured as the integral rear cross reinforcement 30, the durability strength of the respective joining regions J1 and J2 can be improved while suppressing an increase of the number of parts. Moreover, the substantially U-shaped first reinforcing portion 52 is used as the reinforcing member in front of the deck mount M3 where the mount lower surface reinforcement 42 is provided, and the substantially L-shaped second reinforcing portion 54 is used as the reinforcing member at a portion (with a downward-facing open cross-section) where the mount lower surface reinforcement 42 is not provided in the cross member 20. That is to say, since the reinforcing structure (form) differs corresponding to the required strength, durability strength of the respective joining regions J1 and J2 can be improved with minimal weight increase. In other words, reduction in weight can be achieved in comparison with a reinforcing structure that realizes equivalent joining strength.

Further, in the vehicle deck structure 10, since the overhang portion 56B is formed at the second reinforcing portion 54 which does not have the lower wall 58, it is possible to cut out the expanded shape S, which has a small portion left over after cutting from the plate material P having a substantially rectangular (parallelogram) shape, to configure the rear cross reinforcement 30. As a result, material yield can be improved while increasing the joining strength of the joining region J2 as described above.

It should be noted that the present invention is not limited to the above-described exemplary embodiment, and that it goes without saying that the present invention can be implemented while carrying out various modifications in a range that does not depart from the gist of the invention. For example, in the above-described exemplary embodiment, although an example is shown in which the lower wall 58 of the rear cross reinforcement 30 is joined with the front flange 42B via the lower anterior flange 40, the present invention is not limited thereto, and a configuration may be provided in which, for example, the lower wall 58 is directly joined with the front flange 42B.

A vehicle deck structure according to a first aspect of the present invention comprises a deck floor extending in a vehicle body front-rear direction and a vehicle width direction; a cross member that is open facing downward in a vehicle body up-down direction and whose longitudinal direction corresponds to the vehicle width direction, the cross member being fixed at a lower surface side in the vehicle body up-down direction with respect to the deck floor; a first reinforcing member forming a closed cross-section structure with the cross member at least one portion in the longitudinal direction of the cross member and comprising a flange portion that overhangs in a vehicle body front-rear direction with respect to the closed cross-section portion and faces the deck floor; a support member that is disposed within the closed cross-section formed by the cross member and the first reinforcing member and supports a fastening load for fastening the cross member to a vehicle body frame; and a second reinforcing member provided at a front side or a rear side in the vehicle body front-rear direction with respect to an installation portion of the support member in the cross member and comprising an upper wall that is fixed at the deck floor, a lower wall that is fixed at the flange portion of the first reinforcing member, and an upright wall that connects the upper wall and the lower wall.

In the above-described vehicle deck structure, a load from a vehicle body frame is input to the cross member, and this load is input to the deck floor via the support member. As a result, accompanying upward deformation of the deck floor, the load acts in a direction in which the cross member and the first reinforcing member are pulled apart. Here, in the present vehicle deck structure, since the second reinforcing member which connects the deck floor and the first reinforcing member in the up-down direction is provided in front of or behind the installation region of the support member, the above-mentioned upward deformation of the deck floor is suppressed, and fixing of the cross member and the first reinforcing member is maintained.

In this manner, in the vehicle deck structure according to the above aspect, deformation of the deck floor can be suppressed.

In the above-described vehicle deck structure, the second reinforcing member may comprise an extending portion in which the upper wall and the upright wall are provided extending to a direction that is offset in the vehicle width direction with respect to the support member, and the second reinforcing member may be fixed to the deck floor and the cross member at the upper wall and the upright wall of the extending portion.

In the vehicle deck structure according to the above aspect, since the extending portion of the second reinforcing member connects the cross member and the deck floor at a position that is offset in the vehicle width direction from the support member in the cross member, deformation of the deck floor can be suppressed more effectively.

In the above-described vehicle deck structure, the second reinforcing member may comprise an overhang portion that overhangs from the upper wall of the extending portion at a side that is spaced apart from the cross member in the vehicle body front-rear direction.

In the vehicle deck structure according to the above aspect, since the overhang portion is formed at the extending portion of the second reinforcing member, i.e., a portion where it is not required to provide the lower wall, the degree of freedom for joining (position, number, etc.) of the upper wall including the overhang portion with the deck floor can be improved, and a contribution is made to even further suppression of deformation of the deck floor, without deterioration of a material yield.

In the above-described vehicle deck structure, a plurality of fixing points may be provided at which the upper wall of the extending portion and the deck floor are fixed, and among the plurality of fixing points, a distance of a fixing point disposed at the overhang portion from an axial center of the supporting member and a distance of one fixing point disposed at the upper wall other than at the overhang portion from the axial center of the supporting member may substantially correspond to each other.

In the vehicle deck structure according to the above aspect, since stress difference at the respective fixing points at the upper wall of the extending portion becomes small, durability strength with respect to load input from the loading load and the road surface is improved.

As described above, the vehicle deck structure according to the present invention has an excellent effect in that deformation of the deck floor can be suppressed.

What is claimed is:

1. A vehicle deck structure comprising:
   a deck floor extending in a vehicle body front-rear direction and a vehicle width direction;
   a cross member that is open facing downward in a vehicle body up-down direction, and whose longitudinal direction corresponds to the vehicle width direction, the cross member being fixed at a lower surface side in the vehicle body up-down direction with respect to the deck floor;
   a first reinforcing member forming a closed cross-section structure with the cross member at least one portion in the longitudinal direction of the cross member, and comprising a flange portion that overhangs in a vehicle body front-rear direction with respect to the closed cross-section portion and faces the deck floor;
   a support member that is disposed within the closed cross-section formed by the cross member and the first reinforcing member and supports a fastening load for fastening the cross member to a vehicle body frame; and
   a second reinforcing member provided at a front side or a rear side in the vehicle body front-rear direction with respect to an installation portion of the support member in the cross member, and comprising an upper wall that is fixed at the deck floor, a lower wall that is fixed at the flange portion, and an upright wall that connects the upper wall and the lower wall.

2. The vehicle deck structure of claim 1, wherein the second reinforcing member comprises an extending portion in which the upper wall and the upright wall are provided extending to a direction that is offset in the vehicle width direction with respect to the support member, and the second reinforcing member is fixed to the deck floor and the cross member at the upper wall and the upright wall of the extending portion.

3. The vehicle deck structure of claim 2, wherein the second reinforcing member comprises an overhang portion that overhangs from the upper wall of the extending portion at a side that is spaced apart from the cross member in the vehicle body front-rear direction.

4. The vehicle deck structure of claim 3, wherein a plurality of fixing points are provided at which the upper wall of the extending portion and the deck floor are fixed, and among the plurality of fixing points, a distance of a fixing point disposed at the overhang portion from an axial center of the supporting member and a distance of one fixing point disposed at the upper wall other than at the overhang portion from the axial center of the supporting member substantially correspond to each other.

* * * * *